(12) United States Patent
Cantwell et al.

(10) Patent No.: US 8,226,828 B2
(45) Date of Patent: Jul. 24, 2012

(54) SAF SYSTEM AND METHOD INVOLVING SPECIFIC TREATMENTS AT RESPECTIVE STAGES

(76) Inventors: Alan David Cole Cantwell, Aston (GB); Paul Antony Zuber, Bury (GB)

(*) Notice: Subject to any disclaimer, the term of this patent is extended or adjusted under 35 U.S.C. 154(b) by 512 days.

(21) Appl. No.: 12/083,489

(22) PCT Filed: Oct. 16, 2006

(86) PCT No.: PCT/GB2006/003835
§ 371 (c)(1), (2), (4) Date: Sep. 24, 2009

(87) PCT Pub. No.: WO2007/042836
PCT Pub. Date: Apr. 19, 2007

(65) Prior Publication Data
US 2010/0006500 A1    Jan. 14, 2010

(30) Foreign Application Priority Data
Oct. 14, 2005   (GB) .................................. 0520900.2

(51) Int. Cl.
*C02F 3/30* (2006.01)
(52) U.S. Cl. ........ 210/605; 210/618; 210/630; 210/794; 210/151; 210/274; 210/903
(58) Field of Classification Search .................. 210/605, 210/617, 618, 630, 792, 794, 150, 151, 274, 210/275, 903
See application file for complete search history.

(56) References Cited

U.S. PATENT DOCUMENTS

| 5,288,407 | A |   | 2/1994 | Bodwell | |
| 5,316,668 | A |   | 5/1994 | Tang | |
| 5,543,039 | A | * | 8/1996 | Odegaard | 210/150 |
| 5,618,431 | A | * | 4/1997 | Kondo et al. | 210/618 |
| 5,750,041 | A | * | 5/1998 | Hirane | 210/618 |
| 5,776,344 | A | * | 7/1998 | McCarty et al. | 210/605 |
| 6,159,364 | A | * | 12/2000 | Hirane | 210/150 |
| 6,210,578 | B1 | * | 4/2001 | Sagastume et al. | 210/605 |
| 6,383,373 | B1 | * | 5/2002 | Nakao et al. | 210/151 |
| 6,682,653 | B2 | * | 1/2004 | Chuang et al. | 210/150 |
| 2003/0111412 | A1 | * | 6/2003 | Jeong et al. | 210/618 |
| 2005/0150829 | A1 |   | 7/2005 | Chen | |

FOREIGN PATENT DOCUMENTS

| EP | 0829456 | 3/1998 |
| WO | WO 9301794 | 9/1993 |
| WO | WO 9809918 | 3/1998 |
| WO | WO 2004/002904 | 1/2004 |

* cited by examiner

*Primary Examiner* — Christopher Upton
(74) *Attorney, Agent, or Firm* — The Weintraub Group, P.L.C.

(57) ABSTRACT

A wastewater treatment system comprising one apparatus (1) for de-nitrification and effluent solids removal, another apparatus (2) for biological main treatment, and a further apparatus (3) for solids removal (5), each apparatus including a volume (40) in which each process is performed, a media-retaining sieve (6) at the volume (40) and arranged to retain buoyant media particles (4) in the volume (40), and a gas sparging device (8), (9) which is located in a lower end region of the volume (40) and which is controllable by way of valves (11) and (15). The three volumes (40) are substantially (10) identical to, or multiples of, each other, the three sieves (6) are substantially identical to each other, and the three sparging devices (8), (9) are substantially identical to each other. The gas is sparged into the main treatment bed at a lower flow rate for wastewater aeration but intermittently at a higher flow rate to disrupt and clean the bed. In a preferred embodiment it is possible to use relatively small media particles because of the provision of the in-situ cleaning arrangement. The biological main stage comprises up to four treatment stages either in internal partitions or in separate tanks.

33 Claims, 4 Drawing Sheets

SAF SYSTEM AND METHOD INVOLVING SPECIFIC TREATMENTS AT RESPECTIVE STAGES

CROSS REFERENCE TO RELATED APPLICATIONS

The present Application is a National Stage filing under 35 U.S.C. §371 of International Patent Application PCT/GB2006/003835, filed 16 Oct. 2006, which claims priority to Great Britain patent application Serial Number 0520900.2, filed on 14 Oct. 2005, the entire disclosures of which are hereby incorporated by reference.

BACKGROUND OF THE INVENTION

1. Field of the Invention

This invention relates to a method of and a system for treatment of wastewater.

Most systems presently used for the purification of wastewater, such as industrial effluent or municipal sewage, employ methods based on biological agents. A broad class of systems bring aerobic bacteria and oxygen into close contact with the impurities within the wastewater. The bacteria can utilise at least some of these as nutrients for respiration and growth. There are two main types of system, plus derivatives thereof, currently in widespread use throughout the World.

The first main type of system is known as the 'Activated Sludge' system. Bacteria are held within particulate suspension of flocs known as sludge that are mixed with incoming wastewater. Air or oxygen is dispersed into this continuously flowing mixture, which is retained within one or more aeration tanks for a period of time sufficient for the bacteria to absorb or oxidise the nutrients within the wastewater. The flocs are then concentrated within a gravity settlement tank. A clear, purified stream leaves the top of this tank and the concentrated flocs (activated sludge) are recycled to the front of the system to be mixed with incoming wastewater. The retention time and degree of recycling of the sludge are such as to allow a specialised community of bacteria to develop which forms the activated sludge.

The second main type of system is known as the 'Trickling Filter' or 'Biological Filter' system. Here the wastewater is spread over the surface of a bed of media through which it then 'trickles' or percolates downwards and laterally. The media consists of individual elements or surfaces of sufficient size and so arranged that air is a continuous phase which is drawn into the bed by natural convection. A film of bacteria grows on the surfaces of the media under the liquid film and here purification takes place with the layer of bacteria and higher life-forms, known as a 'biofilm', growing thicker until the force of the down-flowing wastewater disrupts part of the layer and sweeps it out of the bed into a gravity settlement tank. The flow from the top of this tank is purified wastewater whilst the sheared-off film settles and accumulates in the bottom of the tank as sludge from where it is periodically drawn off. The distinction from the above-described activated sludge system is that the biofilm is not recycled but remains attached to the media until the shearing action of the trickling liquid dislodges it. Also air is introduced by natural convection, rather than forced convection as in the activated sludge system.

Developments and derivatives of these two main types of system are used which enable better effluent quality and/or lower operating costs and/or intensified smaller units to be achieved.

Two hybrid derivatives used are known as the "Biological Aerated Flooded Filter" (BAFF) system and the Submerged Aerated Filter (SAF) system.

The BAFF system uses fine media of granules of plastics or inorganic material upon which bacteria grow. Air is supplied to the bed directly but no settlement stage is required since the media is small enough to retain any solids, sheared from the bacterial film or included in the wastewater, by physical filtration and absorption. Eventually the pressure loss of flow of wastewater through the bed becomes too high, owing to the level of retained solids blocking the spaces among the media elements, and a cleaning system is required to remove solids accumulated in the bed. In the case of a system known as Biobead™ (United Kingdom Trade Mark Registration 1429397) and disclosed in EP-B-0533754, an increased rate of flow of air is used to put the media into motion, so resulting in cleaning of the media, in particular disruption of the biofilm, by shearing and attrition.

The SAF system uses larger media composed of large particles (in the form of irregularly shaped solid lumps or of plastics rings) or arrays of fixed surfaces. Such large particles may be of sizes of between, say, 20 mm. and 60 mm. Again air is introduced under pressure below the media bed for the purpose of aeration for aerobic biological treatment. Minimal solids filtration occurs because the size of the media is too large. Instead solids are eroded from the biofilm by the shearing action of influent flows and are then swept out of the media bed and onwards into a gravity settlement tank where solids separate and purified wastewater passes out at the top. Thus a media element cleaning system is not required during normal operation, which further distinguishes the SAF system from the BAFF system.

An essential difference between a BAFF system (as in WO91/18658) and the SAF system disclosed herein is that the BAFF system, mainly by virtue of having smaller media (the preferred maximum dimension disclosed in WO91/18658 being 3 mm. to 5 mm.), performs plural forms of treatment in a single stage, e.g. biological and solids removal. If a further stage is added, it performs further plural treatment in that stage. The SAF system, mainly owing to its larger media and fully mixed hydraulics (as opposed to plug flow hydraulics), can, when aerated, perform only a single form of biological treatment in a single stage and, in an aerobic biological treatment, is unable to retain solids; indeed solids are added to the effluent.

Even though SAF systems are supposedly self-cleaning, over a period of time the media bed can become blocked owing either to overload or to the accumulation of inert material such as fibres or plastic detritus. This risk also dictates that the media elements must be large and open-structured to minimize blockage. Smaller media elements would be more effective in the short term since the resulting higher surface area per unit volume and smaller niches among media elements would allow more bacteria and higher life-forms to be retained within the biofilm, which would increase the purification rate. In the longer operating timescale, owing to the blockage problem small-sized media elements are not practical.

The use of gravity settlement also limits performance, since small-sized effluent solids can escape with the final effluent flowing from the settlement tank, so reducing effluent quality. Also the process of de-nitrification of nitrified effluents can lift flocs of bacteria settled on the base of the tank by the growth and attachment of bubbles of nitrogen produced by the de-nitrification process. Further the large size of settlement tanks required by the gravity settlement process prevents their use where space is at premium.

SUMMARY OF THE INVENTION

According to a first aspect of the present invention, there is provided a method of treatment of wastewater, comprising performing in a submerged aerated filter system differing specific forms of treatment at respective stages, with sparging of gas at those stages, said differing specific forms of treatment being biological main treatment, effluent solids removal and one of substantially solely de-nitrification and a combination of de-nitrification and effluent solids removal, utilising respective beds of buoyant media particles, said main treatment comprising using its bed of media particles for support of biofilm with said sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, said solids removal comprising using its bed of media particles to filter-out the solids from the liquid with substantially no sparging at the solids removal stage, said sparging of gas being performed intermittently at said solids removal stage to disrupt and thereby clean said bed, said substantially solely de-nitrification, if performed, comprising using its bed of media particles for support of biofilm with substantially no sparging with oxygen-containing gas at the substantially solely de-nitrification stage, sparging of gas being performed intermittently at said substantially solely de-nitrification stage to disrupt and thereby clean said bed at said substantially solely de-nitrification stage, and said combination, if performed, comprising using its bed of media particles for support of biofilm with substantially no asparging with oxygen-containing of the combined de-nitrification and effluent solids removal stage, sparging of gas being performed intermittently at that combined stage to disrupt and thereby clean said bed at said combined stage.

According to a second aspect of the present invention, there is provided a wastewater treatment system, comprising one apparatus dedicated to performing biological main treatment, another apparatus dedicated to performing effluent solids removal, and a further apparatus dedicated to performing either substantially solely de-nitrification or a combination of de-nitrification and effluent solids removal, each apparatus including a volume in which the dedicated process is performed, a media-retaining sieve at said volume and arranged to retain buoyant media particles in said volume, and a gas sparging device which is located in a lower end region of said volume and which is controllable.

Owing to these aspects of the invention, it is possible to make the apparatuses employed at the respective stages more nearly identical in the functions (and even the constructions and relative positionings) of their component parts, so obtaining greater uniformity of design, fabrication and operation. Furthermore, changing the form of treatment at one stage to another form of treatment is made simpler.

Examples of the differing specific forms of treatment are biological main treatment, effluent solids removal (possibly before and/or after biological main treatment), de-nitrification (possibly before and/or after biological main treatment), and a combination of de-nitrification and effluent solids removal (possibly before and/or after biological main treatment).

Examples of the component parts which may be identical are tanks, media, media-retaining sieves, spargers, valves, air inlets and outlets and liquid inlets and outlets.

According to third aspect of the present invention, there is provided a method of treatment of wastewater in a submerged aerated filter system, comprising performing biological main treatment of the liquid at a main treatment stage and filtering-out solids from the liquid at a solids removal stage without biological treatment, wherein said filtering-out of said solids is by means of a bed of media particles at said solids removal stage and wherein intermittently said bed is disrupted and thereby cleaned by sparging of gas into the liquid at said solid removals stage, there being substantially no sparging at said solids removal stage during said filtering-out, and wherein said main treatment comprises using a bed of media particles at said main treatment stage for support of biofilm with sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage.

Owing to this aspect of the invention, it is possible to remove the solids more effectively from the liquid because filtering is more effective than gravity settlement.

According to a fourth aspect of the present invention, there is provided a method of treatment of wastewater, comprising performing in a submerged aerated filter system differing specific forms of treatment at respective stages, with sparging of gas at those stages, said differing specific forms of treatment being a plurality of biological main treatment, effluent solids removal and one of substantially solely de-nitrification and a combination of de-nitrification and effluent solids removal, utilising respective beds of buoyant media particles, in respective reactors in series with each other, said main treatment, if performed, comprising using its bed of media particles for support of biofilm with said sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, said solids removal, if performed, comprising using its bed of media particles to filter-out the solids from the liquid with substantially no sparging at the solids removal stage, said sparging of gas being performed intermittently at said solids removal stage to disrupt and thereby clean said bed, said substantially solely de-nitrification, if performed, comprising using its bed of media particles for support of biofilm with substantially no sparging of oxygen-containing gas at the substantially solely de-nitrification stage, sparging of gas being performed intermittently at said substantially solely de-nitrification stage to disrupt and thereby clean said bed at said substantially solely de-nitrification stage, said combination, if performed, comprising using its bed of media particles for support of biofilm, with substantially no sparging with oxygen-containing gas being performed at the combined de-nitrification and effluent solids removal stage, sparging of gas being performed intermittently at that combined stage to disrupt and thereby clean said bed at said combined stage.

Owing to this aspect of the present invention, it is possible to avoid problems encountered when treatment stages are superimposed in respective zones in a single reactor, these problems being difficulties of design, manufacture and operation and inability relatively easily to change a reactor from performing one form of treatment to another form of treatment.

The biological main treatment could be carbon removal and/or nitrification.

In a preferred embodiment of the present SAF system, it is possible to use relatively small media particles (of a size of between 5 mm. and 20 mm.) because of the provision of an in situ cleaning arrangement. In this arrangement, plastics media of a media bed (preferably a floating media bed) of the biological main stage can be set into motion, to produce a strong circulation of the media particles and a strong action of attrition of the biofilm among the media particles, solely by the use of an increased flow of injected air. The vigour of this cleaning motion is not restricted by brittleness of the media if the media is made of appropriate plastics. Smaller media particles, especially in the form of longitudinally internally partitioned short tubes, can provide the high surface areas which in turn allow the retention of high concentrations of bacteria within the media bed. Smaller media particles also bring about a higher number of 'pinch' points which change the direction of flow of the liquid and more niches where solids can become lodged.

The same media can be installed in a second bed in the solids removal stage into which the flow from the first SAF bed can be led in order to remove solids issuing from the biological main stage. This second stage has no aeration and is a normally quiescent zone with media bed surfaces upon which settlement occurs and among which filtration later occurs owing to the accumulation of settled particles. This accumulation of solids enhances retention of further solids owing to their acting as sticky surfaces. These same media may also be put into motion by a high flow of air in the same manner as described above for the biological main stage when this becomes necessary to remove accumulated solids, so as to reduce obstruction to flow and thus retain hydraulic capacity.

Air is fed into the base of the media bed through an array of diffusers. During normal operation a lower airflow rate is used for aeration to supply oxygen to the biological reaction. This air flow is increased to a much higher level so as to induce bulk circulation of and attrition within the media bed which is thus cleaned. For the solids removal process, no aeration is used during normal operation but the higher rate of air flow is used when bed cleaning is required.

The use of identical media and identical media-cleaning arrangements within both the biological main and solids removal stages of a SAF system greatly facilitates the design, construction and operation of the system since a common module can be used for a variety of duties.

The biological main stage will normally contain up to four sub-stages created either by internal partitions or by separate tanks. The exact arrangement will depend on the strength and treatability of the wastewater and the sub-stages could be in series or parallel. For example, a strong waste-water would be better treated in sub-stages arranged in series with each other, whereas a weaker waste would benefit from parallel sub-stages so as to maximise reaction and diffusion into the biofilm.

A media-filled stage before the biological main stage can be used for solids removal prior to the biological main treatment. Also, a media-filled stage before the biological main stage could be used for de-nitrification. This applies in circumstances where nitrate produced within the biological main stage is reduced to nitrogen by mixing of recycled treated effluent with influent wastewater. This mixture is contacted with the media-filled stage where the conditions are anaerobic and de-nitrifying bacteria will accumulate. This same stage would also simultaneously remove solids. Thus, the same stage design can be used for removal of solids before biological main treatment, de-nitrification before biological main treatment, biological main treatment for carbon removal and oxidation of ammonia, de-nitrification after biological main treatment by provision of a carbon source such as alcohol or other suitable easily bio-degradeable substance, and a final solids removal stage. This, together with the use of identical tubular media, gives a unique benefit in design, fabrication and operation for a wide range of applications. These features also allow simple upgrading and change of duty for existing units.

As described previously, the media can be of smaller size, which gives larger surface area and a higher number of media particle contact points, which are essential to achieving higher biological reaction rates and higher solids separation with identical media particles. Each media particle may be a tubular cylinder 8 mm. to 15 mm. in both length and external diameter with a wall thickness of 0.5 mm. to 2 mm. However, each media particle is preferably a tubular cylinder 10 mm. to 20 mm. in external diameter and 3 mm. to 10 mm. in length, with a wall thickness of 0.5 mm. to 2 mm. The hollow part of the cylinder may also have a number of partitions which serve both to strengthen the media particle and provide high surface area. Without the cleaning mechanism described earlier, media of such design and size would not be suitable for use in a fixed bed SAF, since they would rapidly become blocked up with solids and require vigorous cleaning. An inconvenient and ineffective form of cleaning such as total removal and pressure jet cleaning is thus avoided. It is the combination of small media operating in SAF mode with an in-situ cleaning system which is unique, since the high performance without blocking of small media is retained indefinitely. In addition, the use, before or after the biological main stage, of the same small media within a hybrid settling filter from which solids can readily be removed produces a high overall unit performance within a very compact structure.

BRIEF DESCRIPTION OF THE DRAWINGS

In order that the invention may be clearly and completely disclosed, reference will now be made, by way of example, to the accompanying drawings, in which.

DETAILED DESCRIPTION OF THE PREFERRED EMBODIMENTS

Figure 1:
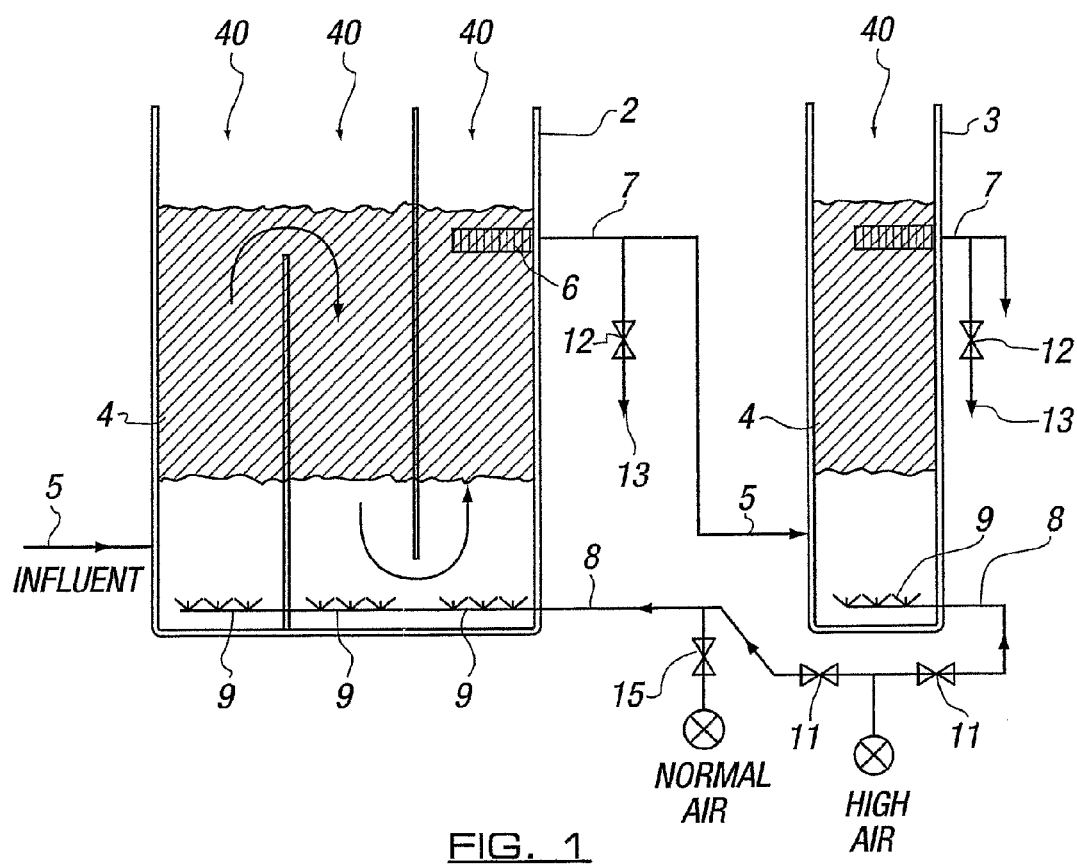
FIG. 1 is a diagrammatic side elevation of a SAF system.
Figure 2:
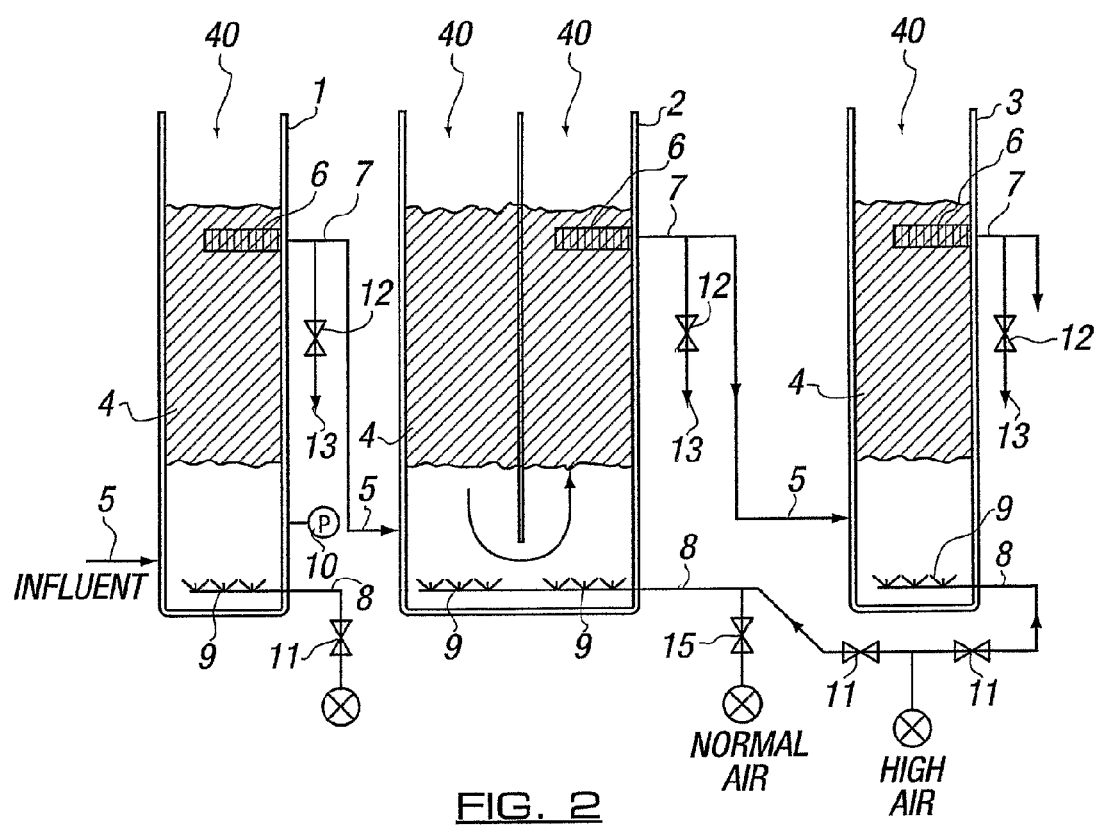
FIG. 2 is a view similar to FIG. 1 of a modified version of the SAF system.
Figure 3:
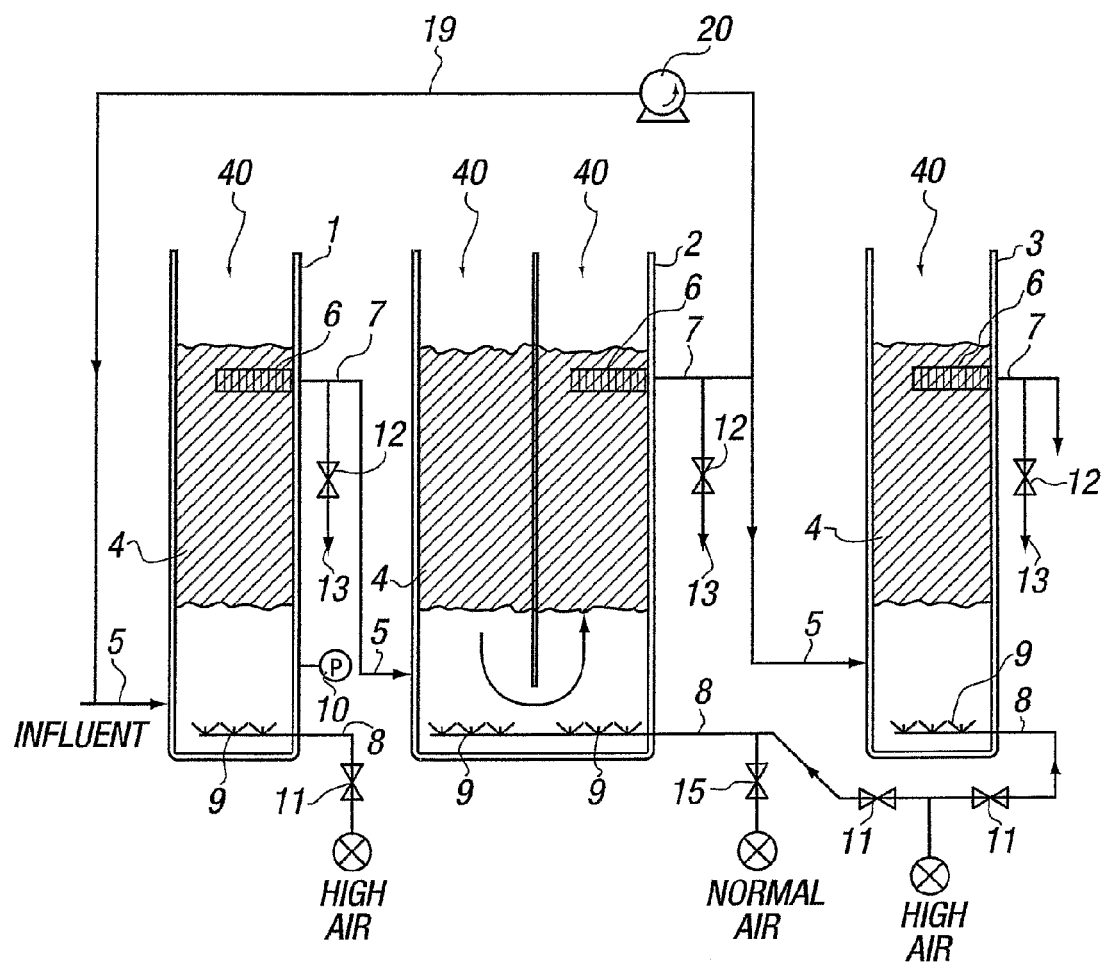
FIG. 3 is a view similar to FIG. 1 of a second modified version of the SAF system.

Referring to FIGS. 1 to 3, these illustrate how the use of identical media and identical media cleaning arrangements within both biological and solids removal stages of a SAF system greatly facilitates the design, construction and operation of the system since a substantially common module can be used for a variety of duties, i.e. forms of treatment of wastewater. A biological main stage 2 contains up to four sub-stages 40 created by either internal partitions (as shown) or separate tanks. The exact arrangement depends on the strength and treatability of the wastewater and these sub-stages 40 can be arranged in series or in parallel. Each sub-stage (i.e. module) 40 is partially filled to 50 to 80% of its tank volume with buoyant plastics media 4 and each stage has an influent inlet 5 whereby liquid influent is fed to below the floating bed of media 4 so formed and leaves through a media retaining sieve 6 and an effluent outlet 7 before passing to the next tank. Through an air inlet 8 of each tank and containing a high flow rate valve 11, air 8 is supplied to each module through an array of diffusers constituting a sparger 9. Each outlet 7 communicates with a de-sludging valve 12 in a de-sludging line 13 of its tank. The respective items referenced 4 to 9 and 11 to 13 can be of identical design to each other.

In FIG. 1, the biological main stage 2 is followed by an only solids-removal stage 3. As shown in FIG. 2, a stage 1 before the stage 3 can be used only for solids removal prior to the biological main treatment. As shown in FIG. 3, this same arrangement could also be used for de-nitrification by recycling, whereby nitrate produced within the biological main stage 2 can be reduced to nitrogen by mixing of the recycled effluent with influent wastewater and contacting within the stage 1, although the conditions in that stage 1 would need to be anaerobic and de-nitrifying bacteria would accumulate. This same stage 1 would again simultaneously remove solids. Thus substantially the same stage design can be used for removal of solids before biological main treatment, de-nitrification before biological main treatment, biological main treatment for carbon removal and oxidation of ammonia, de-nitrification after biological main treatment by provision of a carbon source such as alcohol or other suitable easily bio-degradeable substance, and a final solids removal stage.

Either by monitoring build-up in pressure in the tank of the stage 1 by a pressure transducer 10 until a prescribed value is reached (or alternatively after the passing of an empirically derived period of time), the air valve 11 is opened, admitting the higher rate of airflow such that the media bed of the stage 1 disrupts and goes into circulation. At the same time, the de-sludging valve 12 is opened so the flow carries the released solids into a sludge holding tank via the outlet 13. This flow is stopped when a predetermined volume as measured by a tank level indicator of that sludge holding tank has been collected. Within the tank of the stage 2 air is normally supplied through the air inlet 8 from a normal flow rate valve 15 to provide air at the lower flow rate for aeration to drive the biological reaction required for wastewater purification. When cleaning of that tank is required, the higher air flow is introduced through its valve 11 and sludge is removed through its valve 12. The effluent from the tank of the stage 2 leaves through its media retention sieve 6 and enters the tank of the stage 3. This stage acts as a solids removal stage since air is not supplied under normal operation. Again, when media cleaning is required, its air valve 11 is opened and air at the higher flow rate is admitted to create the media cleaning action described previously, with the sludge flowing through the valve 12 to the sludge holding tank.

In FIG. 3, recycle stream ducting 19 containing a pump 20 is provided from the tank of the stage 2 to the tank of the stage 1. This produces a de-nitrification effect within the first stage 1 where anaerobic conditions exist such that the nitrate formed by the oxidation of ammonia in the stage 2 is utilised as the source of oxygen in the stage 1.

Figure 4:
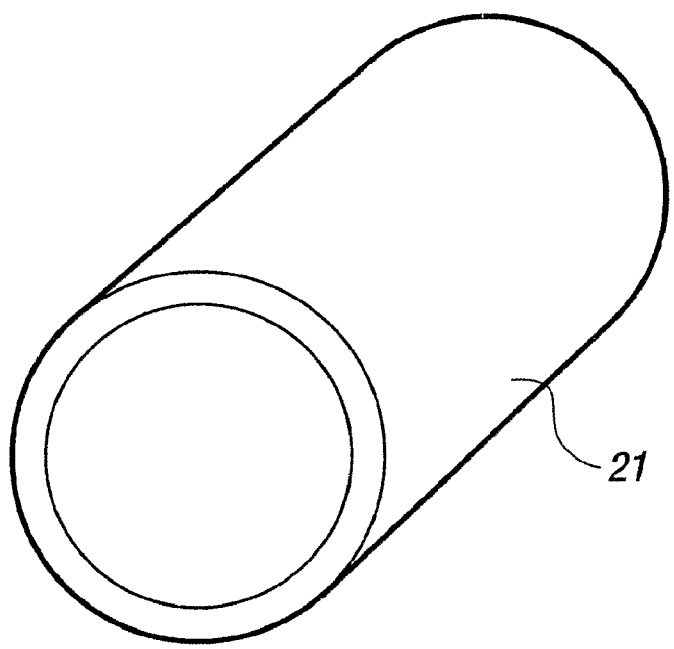
FIGS. 4 and 5 are perspective views of respective differing media particles usable in the SAF system.
Figure 5:
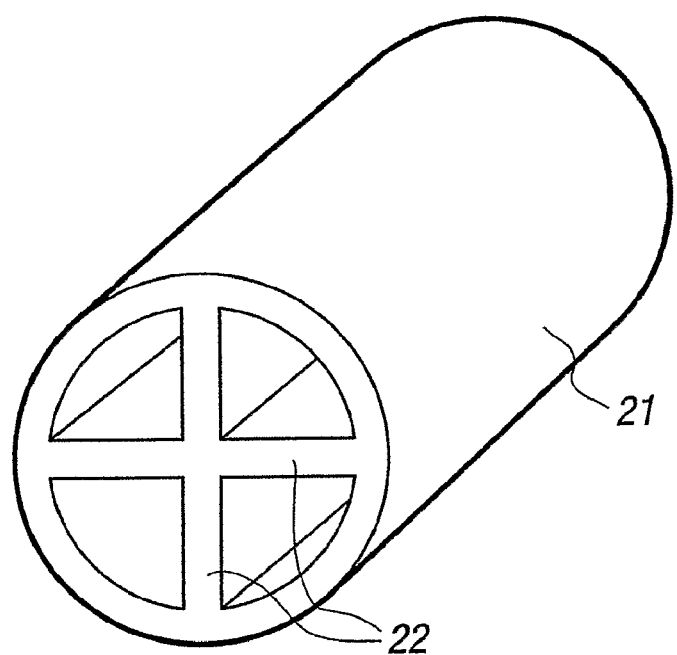

FIG. 4 shows that each particle of the media 4 may be in the form of a hollow cylinder 21 of 5 mm. to 15 mm. diameter and 5 mm. to 15 mm. length and 0.5 mm. to 2.0 mm. thick. The hollow cylinder 21 may contain longitudinal partitions 22, as shown in FIG. 5.

The plastics material of the media 4 may be of a specific gravity from 0.85 to 0.97, particularly polypropylene or polyethylene, or other plastics material with air inclusions sufficient to produce a specific gravity of from 0.85 to 0.97.

Although the invention has been described with reference to particular embodiments, it is to be understood that these embodiments are merely illustrative of the principles and applications of the present invention. It is therefore to be understood that numerous modifications may be made to the illustrative embodiments and other arrangements may be devised without departing from the spirit and scope of the present invention as defined by the appended claims.

We claim:

1. A method of treatment of wastewater, comprising performing in a submerged aerated filter system differing specific forms of treatment at respective stages, with sparging of gas at those stages, said differing specific forms of treatment being biological main treatment, effluent solids removal and one of substantially solely de-nitrification and a combination of de-nitrification and effluent solids removal, utilising respective beds of buoyant media particles, said main treatment comprising using its bed of media particles for support of biofilm with said sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, said solids removal comprising using its bed of media particles to filter-out the solids from the liquid with substantially no sparging at the solids removal stage, said sparging of gas being performed intermittently at said solids removal stage to disrupt and thereby clean said bed, said substantially solely de-nitrification, if performed, comprising using its bed of media particles for support of biofilm with substantially no sparging with oxygen-containing gas at the substantially solely de-nitrification stage, sparging of gas being performed intermittently at said substantially solely de-nitrification stage to disrupt and thereby clean said bed at said substantially solely de-nitrification stage, and said combination, if performed, comprising using its bed of media particles for support of biofilm with substantially no asparging with oxygen-containing of the combined de-nitrification and effluent solids removal stage, sparging of gas being performed intermittently at that combined stage to disrupt and thereby clean said bed at said combined stage.

2. A method according to claim 1, wherein the media particles in the plurality of media beds are identical to each other.

3. A method according to claim 1, wherein said media particles are of tubular form.

4. A method according to claim 3, wherein the media particles are each of a size of from 10 mm to 20 mm in diameter and from 3 mm to 10 mm in length.

5. A method according to claim 3, wherein the media particles are each of a size of from 8 mm to 5 mm in external diameter and in length.

6. A method according to claim 3, wherein each of said particles has a wall thickness of 0.5 mm to 2 mm.

7. A method according to claim 3, wherein said media particles contain longitudinal partitions.

8. A method of treatment of wastewater in a submerged aerated filter system, comprising performing a plurality of differing specific forms of treatment at respective stages, said differing specific forms of treatment comprising biological main treatment of the liquid at a main treatment stage and filtering-out solids from the liquid at a solids removal stage without biological treatment, wherein said filtering-out of said solids is performed after said biological main treatment and is by means of a bed of buoyant, tubular media particles at said solids removal stage and wherein intermittently said bed is disrupted and thereby cleaned by sparging of gas into the liquid at said solid removals stage, there being substantially no sparging at said solids removal stage during said filtering-out, and wherein said main treatment comprises using a bed of buoyant, tubular media particles at said main treatment stage for support of biofilm with sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, the media particles in the media beds used in said plurality of differing specific forms of treatment being identical to each other.

9. A method according to claim 8, wherein the media particles are each of a size of from 10 mm to 20 mm in diameter and from 3 mm to 10 mm in length.

10. A method according to claim 8, wherein the media particles are each of a size of from 8 mm to 15 mm in external diameter and in length.

11. A method according to claim 8, wherein each of said particles has a wall thickness of 0.5 mm to 2 mm.

12. A method according to claim 8, wherein said media particles contain longitudinal partitions.

13. A method of treatment of wastewater, comprising performing in a submerged aerated filter system at least two differing specific forms of treatment at respective stages, with sparging of gas at those stages, said differing specific forms of treatment being selected from biological main treatment, effluent solids removal and one of substantially solely de-nitrification and a combination of de-nitrification and effluent solids removal, utilising respective beds of buoyant media particles, in respective reactors in series with each other, said main treatment, if performed, comprising using its bed of media particles for support of biofilm with said sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, said solids removal, if performed, comprising using its bed of media particles to filter-out the solids from the liquid with substantially no sparging at the solids removal stage, said sparging of gas being performed intermittently at said solids removal stage to disrupt and thereby clean said bed, said substantially solely de-nitrification, if performed, comprising using its bed of media particles for support of biofilm with substantially no sparging of oxygen-containing gas at the substantially solely de-nitrification stage, sparging of gas being performed intermittently at said substantially solely de-nitrification stage to disrupt and thereby clean said bed at said substantially solely de-nitrification stage, said combination, if performed, comprising using its bed of media particles for support of biofilm, with substantially no sparging with oxygen-containing gas being performed at the combined de-nitrification and effluent solids removal stage, sparging of gas being performed intermittently at that combined stage to disrupt and thereby clean said bed at said combined stage, wherein said media particles of said respective beds are of tubular form.

14. A method according to claim 13, wherein the media particles in the plurality of media beds are identical to each other.

15. A method according to claim 13, wherein the media particles are each of a size of from 10 mm to 20 mm in diameter and from 3 mm to 10 mm in length.

16. A method according to claim 13, wherein the media particles are each of a size of from 8 mm to 15 mm in external diameter and in length.

17. A method according to claim 13, wherein each of said particles has a wall thickness of 0.5 mm to 2 mm.

18. A method according to claim 13, wherein said media particles contain longitudinal partitions.

19. A wastewater treatment system, comprising one apparatus adapted to perform biological main treatment at one treatment stage, another apparatus adapted to perform effluent solids removal at another treatment stage, and a further apparatus adapted to perform at a further treatment stage either substantially solely de-nitrification or a combination of de-nitrification and effluent solids removal, each apparatus including a volume in which the process is performed, a media-retaining sieve at said volume and arranged to retain buoyant media particles in said volume, and a gas sparging device which is located in a lower end region of said volume and which is controllable, wherein the three volumes of said one apparatus, of said other apparatus and of said further apparatus are substantially identical to, or multiples of, each other.

20. A system according to claim 19, wherein the sieves are substantially identical to each other.

21. A system according to claim 19, wherein the sparging devices are substantially identical to each other.

22. A system according to claim 19, wherein said media particles are present in each volume, the particles being identical from volume-to-volume.

23. A system according to claim 22, wherein said media particles are of tubular form.

24. A system according to claim 23, wherein said particles are each of a size from 10 mm to 20 mm in diameter and from 3 mm to 10 mm in length.

25. A system according to claim 23, wherein the media particles are each of a size of from 8 mm to 15 mm in external diameter and in length.

26. A system according to claim 23, wherein each of said particles has a wall thickness of 0.5 mm to 2 mm.

27. A system according to claim 23, wherein said media particles contain longitudinal partitions.

28. A method of treatment of wastewater in a submerged aerated filter system, comprising performing biological main treatment of the liquid at a main treatment stage and filtering-out solids from the liquid at a solids removal stage without biological treatment, wherein said filtering-out of said solids is by means of a bed of buoyant, tubular media particles at said solids removal stage and wherein intermittently said bed is disrupted and thereby cleaned by sparging of gas into the liquid at said solid removals stage, there being substantially no sparging at said solids removal stage during said filtering-out, wherein said main treatment comprises using a bed of buoyant, tubular media particles at said main treatment stage for support of biofilm with sparging of gas at said main treatment stage being normally of a gas comprised of oxygen and at a lower rate of flow for aeration of the wastewater at said main treatment stage, but intermittently at a higher rate of flow to disrupt and thereby clean said bed at said main treatment stage, and wherein the media particles in the media beds at the solids removal stage are identical to each other and to the media particles in the main treatment stage.

29. A wastewater treatment system, comprising one apparatus adapted to perform at one treatment stage biological main treatment, and another apparatus adapted to perform at another treatment stage effluent solids removal and located after said one apparatus, each apparatus including a volume in which the process is performed, a media-retaining sieve at said volume and arranged to retain buoyant media particles in said volume, and a gas sparging device which is located in a lower end region of said volume and which is controllable, wherein the two volumes of said one apparatus and of said other apparatus are substantially identical to, or multiples of, each other.

30. A system according to claim 29, wherein the sieves are substantially identical to each other.

31. A system according to claim 29, wherein the sparging devices are substantially identical to each other.

32. A system according to claim 29, wherein said media particles are present in each volume, the particles being identical from volume-to-volume.

33. A system according to claim 29, wherein said media particles are of tubular form.

* * * * *